July 6, 1948.　　　M. PARRISH, JR　　　2,444,524
VISOR
Filed Aug. 6, 1946　　　　　　　　　　2 Sheets-Sheet 1
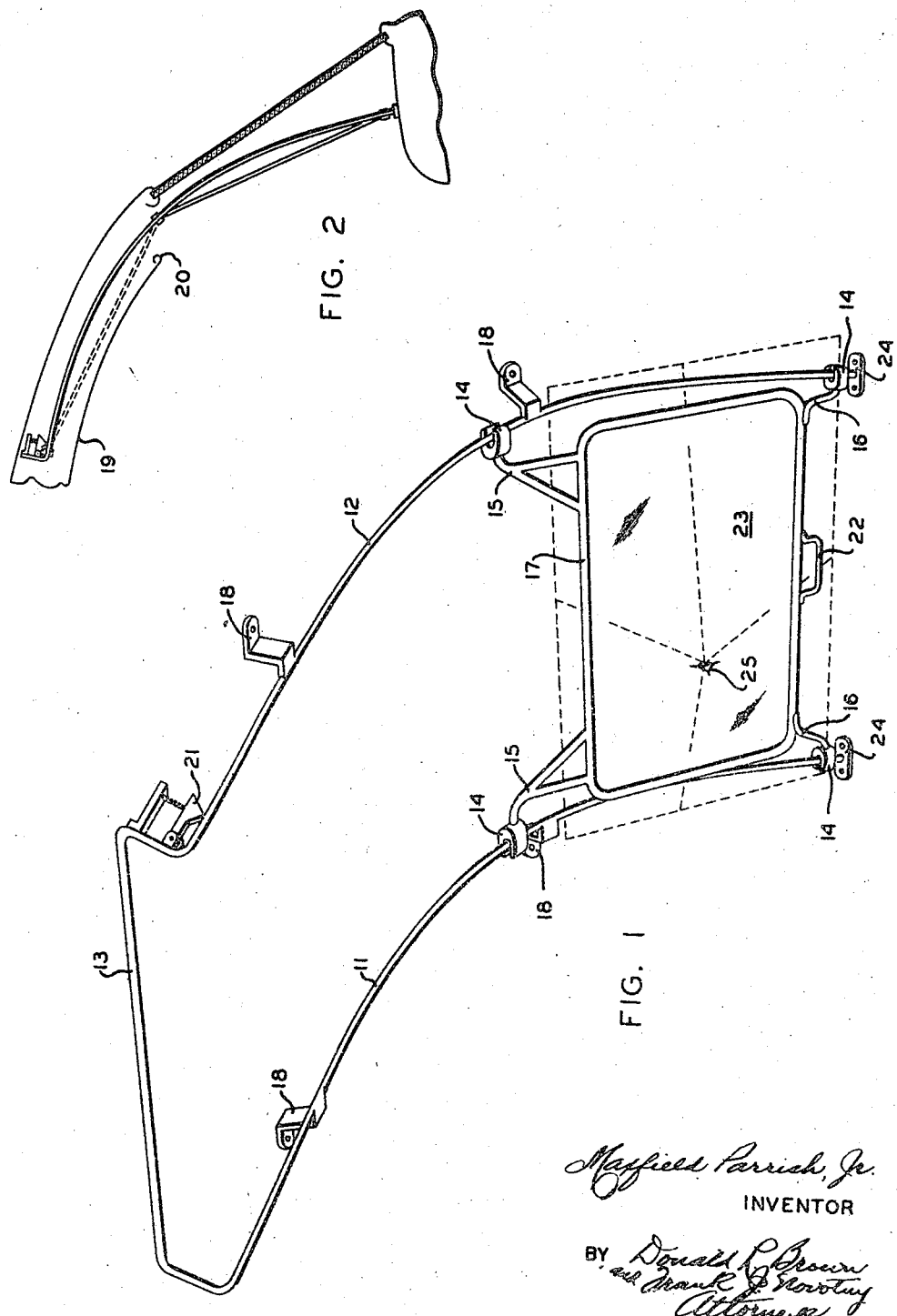
Mayfield Parrish, Jr.
INVENTOR
BY Donald R. Brown
and Frank J. Novotny
Attorneys

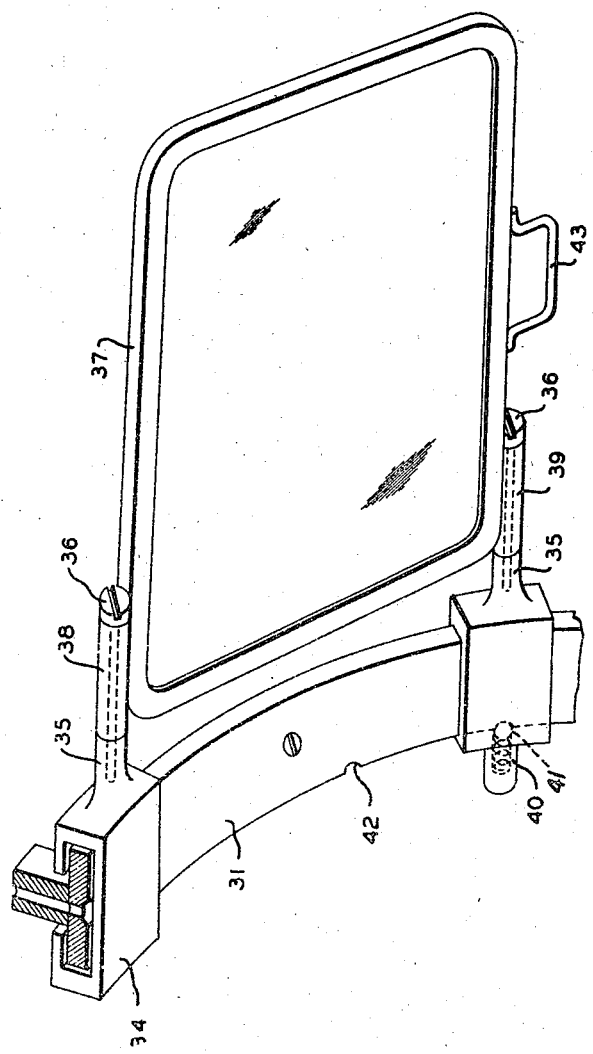

Patented July 6, 1948

2,444,524

UNITED STATES PATENT OFFICE 2,444,524

VISOR

Maxfield Parrish, Jr., Lexington, Mass., assignor to Polaroid Corporation, Cambridge, Mass., a corporation of Delaware Application August 6, 1946, Serial No. 688,643

2 Claims. (Cl. 296—97)

This invention relates to an improved visor support. More particularly it embraces a slidably positionable visor which is used with antiglare material, the visor being adapted to be readily positioned within or without the field of view of the operator of a vehicle by merely flipping or positioning the framework of the visor by a sliding motion along one or more resilient rails which fix the path of travel and on which the frame is frictionally mounted by means of guiding lugs.

In one modification the frame is held in position along the rails by means of one or more ball latches affixed to the frame and adapted to engage stops or indentations in the rails. With this modification, the visor is readily maintained in a fixed position on the rails.

Heretofore, visors of a type fulcrumed or hinged at one edge, preferably the top, have been utilized. However, with a visor thus attached it has been imposssible to adjust the visor to the varying heights necessary to position the visor in the line of sight of a tall or short operator or driver of a vehicle.

It is an object of this invention to provide a visor capable of being positioned at various heights in accordance with the field of view or line of sight indicated by the level of the operator's eye.

A further object of this invention is to provide a visor which is rigidly held and thus not capable of shifting its position due to sudden jarring, stopping, or such similar irregularities of operation as occur in the course of driving a vehicle.

Another object is to provide a visor which is resiliently held in any one of a number of positions by the resilience of the guide rails, the resilience being effected in any one or both of two mutually independent directions.

Still other objects will be suggested upon reading the following description of a number of figures of various embodiments of this invention. It is to be understood that the figures are merely illustrative and not limitative of the scope of the invention.

In the figures:

Figure 1 is a perspective view from the driver's seat of one embodiment of the visor support wherein the positioning or mounting device utilizes two guide rails;

Fig. 2 is a sectional view of the rails mounted in a commercial type of sedan, showing the close conformity between the contour of the guide rails and the inside of the front and top of the car body, the particular embodiment therein shown being capable of hiding the visor from view in the top of the car when the use of the visor is unnecessary; and Fig. 3 shows still another embodiment utilizing a single resilient guide rail of rectangular cross-section provided with a ball latch for holding the visor in any one of a number of predetermined positions.

Referring now in more detail to the figures, 11 and 12 are a pair of resilient guiding rails formed from one continuous piece of metal rod bent into an inverted U-shape. A cross piece 13 serves as a connecting member between the two rails 11, 12 and simultaneously functions to displace and suspend the rails from the top to provide a space into which the visor slides free from contact with the top of the car. Rails 11 and 12 are resiliently distensible outwardly and inwardly as well as backwards and forwards in order to exert a multiple spring tension or holding effect on the visor member slidably engaging these rails. Runners or guide lugs 14 ride on the rails 11, 12 and have affixed thereto frame supporting members 15, 16. The elongated supporting members 15 are preferably somewhat larger than members 16 in order to facilitate the upward and downward sliding of frame member 17. This arrangement prevents any seizure or jamming of the visor frame such as would result if the runners were positioned more closely together on frame 17. Guide rails 11, 12 are held rigidly in position while remaining resilient at the outer portions of brackets 18, which in turn are fastened securely into the top, doorpost and central windshield support of the car.

The upper portion of the guide rails 11, 12 and cross piece 13, as well as the whole visor, are hidden from view when not in use; the upper portion of the guide rails is hidden and the visor is capable of being slid upwards between the lining of the roof 19 and the metallic top of the car through opening 20. A spring clip or similar fastening means 21 serves to hold the visor in its elevated position from which it can be easily lowered by pulling handle 22, while the two-way resilience of rails 11, 12 against guide members 14 serves to hold the visor rigidly in any position to which it is lowered. Stops 24 serve as lower terminals against which the visor rests in its lowest position.

The light polarizing material 23 may be disposed with its transmission axis at any predetermined angle to the vertical. Thus for use as a night visor, together with a more common type shaped windshield, the axis of transmission may be set at any one of a number of angular positions to the left of vertical, such as −22½°, −35°, −45°, or at points intermediate thereto. The particular setting depends, of course, on the system of polarized light used in the headlights of the oncoming car as well as that used in the operator's headlights. By using a light polarizing material with its transmission axis vertically disposed, the visor becomes a highly efficient sun shield for day driving. In any event, it has been found that a preferred size for the visor frame 17 is that which effectively subtends the entire windshield area of the operator's half of a V-shaped windshield as seen by the operator's eye 25, Fig. 1, positioned behind the visor 17 when the latter is in its lowered position.

The modification shown in Fig. 3 is adapted for use with a single resilient guide rail 31 which is preferably rectangular in cross-section. Guide rail 31 has fitted thereto guides or runners such as 34 which likewise are provided with extended portions 35 to each of which a collar 38, 39 is journalled by means of bolt 36. Collar 38 is rigidly fastened to and integral with frame 37. A similar collar 39 serves as a lower support for frame 37.

The form of guide rail shown in Fig. 3 is merely an illustrative and not a limitative embodiment of the scope of the invention.

The runners 34 are free to rotate relatively to member 38 on bolt 36 which is securely fastened into lug or extension 35 of the runner. Collar 38 thus holds the visor and its frame securely against movement while allowing the runners 34 to move freely without binding while riding over the curved portions of the guide rail 31. For best results it is preferable that the visor be positioned perpendicularly to the driver's line of sight. However, this invention is not limited to any one specific angle of orientation between the windshield and the visor surfaces.

A ball latch, such as 40, Fig. 3, the spring biased ball 41 of which engages a detent such as 42, is used to maintain the visor frame 37 in a fixed and predeterminable position from which the visor is readily shifted by merely administering a slight lifting or lowering force by way of handle 43. Thus the ball latch together with the resilient guide rail serves to hold the visor in a predeterminable position along the rail 31.

In some embodiments wherein this invention is utilized, the headlights of an oncoming car are presumed to include light polarizing means which may be constituted in such a manner as to effect its contemplated function, i. e., an effective antiglare device.

Thus the polarizing means may comprise any suitable sheet-like polarizer such as those commercially known and sold under the trade-mark "Polaroid" and more specifically that disclosed in the United States Patent 2,173,304, issued to Land and Rogers, or that disclosed in United States Patent 2,237,567, issued to E. H. Land.

For the purposes of this invention, as more clearly shown in the figures, it has been found expedient to incorporate the analyzer as a physically separate means such as a conventionally manually or otherwise controllable drop flap or similar type of slidable visor located to the rear of its immediately associated windshield and so arranged as to intercept the forward line of sight of a driver seated within the car. It is to be understood that any other similar or suitable type of analyzer operating in a manner corresponding to that of the visor herein disclosed may also be used as long as it is capable of fulfilling the purposes of this invention as hereinafter described and claimed.

Of the various systems utilizing polarized light, those quantatively designated as 45°, 35°, 22½°, etc., as indicated by the size of the angle between the transmission axis of the analyzer and the vertical and having a sign indicated as "positive" or "negative" are respectively defined in accordance with whether the orientation of the transmission axis is respectively defined as extending from the upper right to the lower left or from the upper left to the lower right in each case as viewed from the driver's seat in the car and looking forward through the windshield.

It is to be understood that certain changes may be effected in the constructions above described as embodying the invention without departing from its scope, and it is intended that all matter contained in the above description, or shown in the accompanying drawings, shall be interpreted as illustrative and not in a limiting sense.

Furthermore, it is to be distinctly understood that various changes, rearrangement of parts, modifications and adaptations may from time to time be made such as convenience or practice may dictate as expedient without in any manner whatsoever departing from the scope or interpretation of the breadth of this invention as above disclosed in the specification and drawings.

It is also to be understood that the following claims are intended to cover all the generic and specific features of the invention herein described, and all statements of the scope of the invention which, as a matter of language, might be said to be embraced therein.

What is claimed is:

1. In combination with an antiglare visor for use in automotive vehicles, a pair of resilient, rodlike guide rails positioned in spaced, parallel relationship within the body of said vehicle, each said rail extending from a point adjacent the lower edge of the windshield of the vehicle to a point adjacent the roof of the vehicle and above the driver's head, means mounting each said rail in spaced relation to the roof and windshield of the vehicle, guide lugs on said visor frictionally slidable upon said rails, said lugs cooperating with said rails to permit movement of said visor along said rails from a position closely adjacent the windshield of said vehicle to a position adjacent the roof of the vehicle and above the driver's head, said guide lugs engaging said resilient rails with such frictional contact as to hold said visor firmly in position upon said rails during operation of said vehicle.

2. A structure as claimed in the preceding claim in which said resilient rails comprise portions of a continuous metal rod of U-shape, which rod comprises a further cross piece displaced from the plane of said resilient rails to provide an abutment against the roof of the vehicle.

MAXFIELD PARRISH, JR.

REFERENCES CITED

The following references are of record in the file of this patent:

UNITED STATES PATENTS

| Number | Name | Date |
|---|---|---|
| 1,605,682 | Mewborn | Nov. 2, 1926 |
| 1,766,162 | Young | June 24, 1930 |
| 1,814,500 | Summerbell | July 14, 1931 |
| 2,358,173 | McFayden | Sept. 12, 1944 |